US010192393B2

(12) United States Patent
Froy, Jr.

(10) Patent No.: US 10,192,393 B2
(45) Date of Patent: Jan. 29, 2019

(54) TECHNIQUES OF USING WEARABLE DEVICES TO PROMOTE RESPONSIBLE GAMING AND RELATED SYSTEMS AND METHODS

(71) Applicant: IGT Canada Solutions ULC, Moncton (CA)

(72) Inventor: David V. Froy, Jr., Lakeville-Westmorland (CA)

(73) Assignee: IGT Canada Solutions ULC, Moncton (CA)

( * ) Notice: Subject to any disclaimer, the term of this patent is extended or adjusted under 35 U.S.C. 154(b) by 0 days.

(21) Appl. No.: 14/966,166

(22) Filed: Dec. 11, 2015

(65) Prior Publication Data

US 2017/0169656 A1 Jun. 15, 2017

(51) Int. Cl.
*A63F 13/00* (2014.01)
*G07F 17/32* (2006.01)

(52) U.S. Cl.
CPC ...... *G07F 17/3225* (2013.01); *G07F 17/3206* (2013.01); *G07F 17/3211* (2013.01); *G07F 17/3244* (2013.01); *G07F 17/3237* (2013.01)

(58) Field of Classification Search
None
See application file for complete search history.

(56) References Cited

U.S. PATENT DOCUMENTS

| | | | | |
|---|---|---|---|---|
| 2003/0232640 | A1* | 12/2003 | Walker | G07F 17/32 463/16 |
| 2006/0287068 | A1* | 12/2006 | Walker | G07F 17/32 463/25 |
| 2009/0082082 | A1* | 3/2009 | Carr-Gregg | G07F 17/32 463/20 |
| 2009/0270170 | A1 | 10/2009 | Patton | |
| 2010/0298044 | A1* | 11/2010 | Acres | G07F 17/34 463/25 |
| 2011/0250972 | A1* | 10/2011 | Horbay | G06Q 10/10 463/42 |
| 2012/0184367 | A1* | 7/2012 | Parrott | G06F 1/163 463/31 |
| 2013/0184070 | A1* | 7/2013 | Gadher | G06F 19/00 463/29 |
| 2013/0337889 | A1* | 12/2013 | Gagner | G07F 17/3209 463/25 |

(Continued)

*Primary Examiner* — Jason Yen
(74) *Attorney, Agent, or Firm* — Sage Patent Group

(57) ABSTRACT

According to some aspects, a method of assessing behavior of a player of a wagering game is provided, the method comprising receiving, at a wagering gaming device, via a wireless communication interface from a wearable device worn by the player of the wagering game, physiological data of the player obtained using at least one sensor of the wearable device worn by the player, determining, using at least one processor, whether the player is exhibiting behavior exceeding at least one predefined risk threshold based at least in part on an automated analysis of the received physiological data and the player's history of gaming actions, and when it is determined that the player is exhibiting the behavior, performing at least one action by the wagering gaming device designed to reduce the exhibited behavior below the at least one predefined risk threshold in response to said determination.

18 Claims, 7 Drawing Sheets

100

200

(56) References Cited

U.S. PATENT DOCUMENTS

| | | | | |
|---|---|---|---|---|
| 2014/0274388 | A1* | 9/2014 | Nguyen | G07F 17/3206 463/31 |
| 2015/0126268 | A1* | 5/2015 | Keilwert | G07F 17/3227 463/23 |
| 2015/0141123 | A1* | 5/2015 | Callaway | G07F 17/3206 463/25 |
| 2016/0093154 | A1* | 3/2016 | Bytnar | G07F 17/3218 463/25 |
| 2016/0371917 | A1* | 12/2016 | Yang | G07F 17/3204 |

* cited by examiner

TECHNIQUES OF USING WEARABLE DEVICES TO PROMOTE RESPONSIBLE GAMING AND RELATED SYSTEMS AND METHODS

BACKGROUND

The present disclosure relates to the field of electronic wagering gaming systems, such as casino gaming, on-line wagering gaming and gaming systems in general.

Examples of gaming systems or machines include slot machines, online gaming systems (e.g., systems that enable users to play games using computer devices such as desktop computers, laptops, tablet computers, smart phones, other mobile devices, etc.), computer programs for use on a computer device, gaming consoles that are connectable to a display such as a television, a computer screen, etc.

Some players of wagering games may exhibit so-called problem gambling behavior, which is sometimes defined as behavior that causes harm (e.g., physical harm, emotional harm, economic harm, etc.) to the player and/or to others. For some players, such behavior may occur sporadically and/or rarely, while for other players it can occur as part of a pattern of addictive behavior. In an effort to curb problem gambling behavior, standards have been developed within the gambling industry to provide help to players, including assistance programs, steps to prevent underage gambling, and responsible marketing.

SUMMARY

Systems, methods and apparatus are provided for determining whether a player of a wagering game is exhibiting problem gambling behavior.

According to some aspects, a method of assessing behavior of a player of a wagering game is provided, the method comprising receiving, at a wagering gaming device, via a wireless communication interface from a wearable device worn by the player of the wagering game, physiological data of the player obtained using at least one sensor of the wearable device worn by the player, accessing, from a processor-readable storage medium of the wagering gaming device, a history of gaming actions previously performed by the player, determining, using at least one processor, whether the player is exhibiting behavior exceeding at least one predefined risk threshold based at least in part on an automated analysis of the received physiological data and the player's history of gaming actions, and when it is determined that the player is exhibiting behavior exceeding the at least one predefined risk threshold, performing at least one action by the wagering gaming device designed to reduce the exhibited behavior below the at least one predefined risk threshold in response to said determination.

According to some aspects, a method of assessing behavior of a player of a wagering game is provided, the method comprising receiving, at a wagering gaming device, via a wireless communication interface from a wearable device worn by the player of the wagering game, physiological data of the player obtained using at least one sensor of the wearable device worn by the player, determining, using at least one processor, whether the player is exhibiting behavior exceeding at least one predefined risk threshold based at least in part on an automated analysis of the received physiological data, and when it is determined that the player is exhibiting behavior exceeding the at least one predefined risk threshold, transmitting to the wearable device an instruction causing the wearable device to present an audible and/or visual alert of the behavior to the player.

According to some aspects, a method of assessing behavior of a player of a wagering game is provided, the method comprising receiving, at a wagering gaming device, via a wireless communication interface from a wearable device worn by the player of the wagering game, physiological data of the player obtained using at least one sensor of the wearable device worn by the player, determining, using at least one processor, whether the player is exhibiting behavior exceeding at least one predefined risk threshold based at least in part on an automated analysis of the received physiological data, and when it is determined that the player is exhibiting a problem gambling behavior, adjusting at least one gaming function of the wagering game to reduce the exhibited behavior below the at least one predefined risk threshold while allowing the player to wager via the wagering gaming device.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
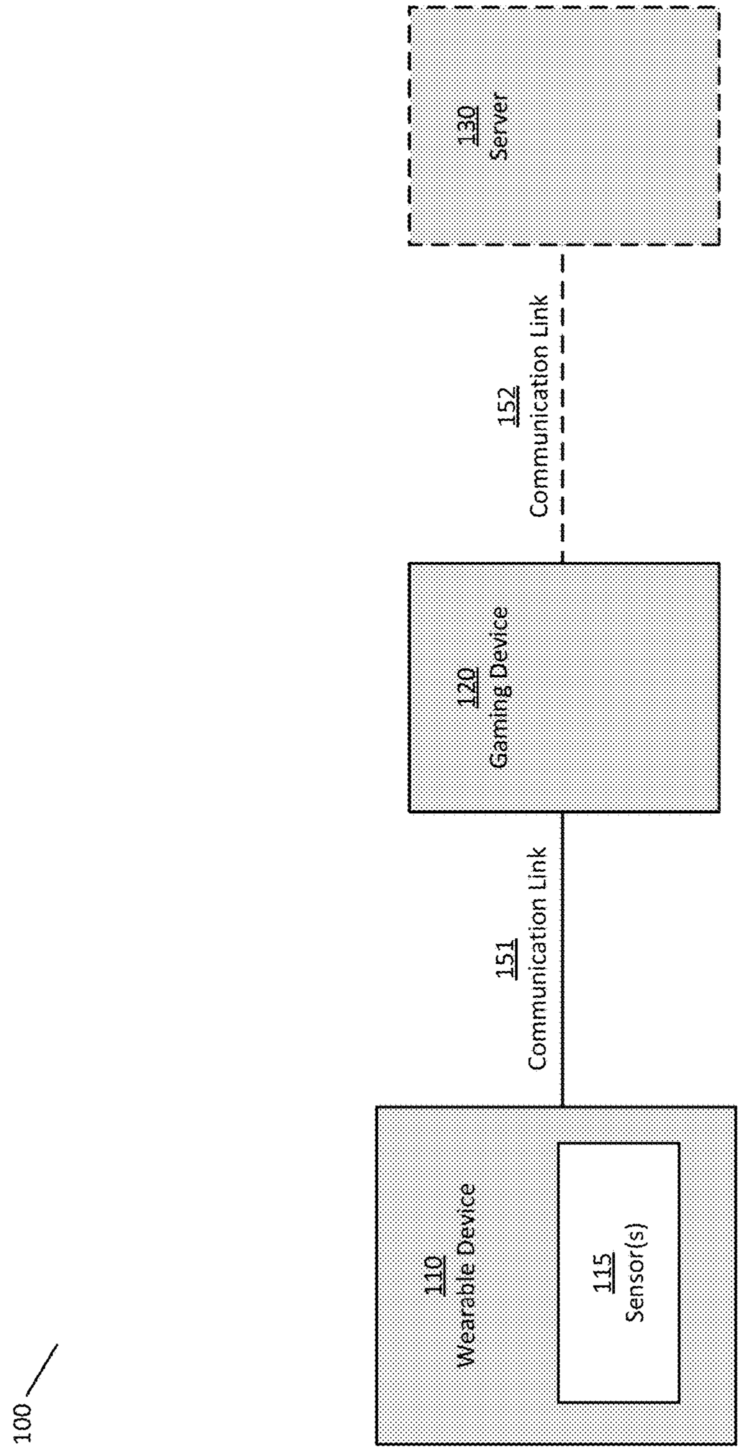
FIG. 1 is a block diagram of an exemplary system suitable for practicing aspects of the present application.

While responsible gaming standards have been applied within the gambling industry, the inventors have appreciated that an individual player of a wagering game today is able to play the game without any real oversight. Even if the player has an extremely problematic gambling addiction, the player will more than likely be free to play wagering games within a casino uninterrupted unless he becomes unruly or disturbs other patrons. The inventors have further recognized that it may also be difficult for the casino to identify the player as one with a gambling addiction, assuming that the casino even considers it in their interest to do so. In the case of a wagering game that may be played on a mobile device, the inventors have recognized that the player may have no oversight to any problem gambling behavior.

The inventors have recognized and appreciated that physiological data from a player of a wagering game may be captured and supplied to a gaming device operating the game. The gaming device may then determine, based at least in part on the physiological data, whether the player is exhibiting problem gambling behavior. In particular, the inventors have recognized that it may be convenient for physiological data to be captured by a wearable device worn by the player, such as a smart watch or headset, which may send the data to the nearby gaming device. This may allow capture of physiological data by a gaming device without the need for additional components that would not otherwise be present when the player uses the gaming device. For example, a player that wears a smart watch in his day-to-day life may play a wagering game using a gaming device and thereby be able to transmit physiological data to the gaming device without the need to obtain additional devices beyond what the player was already carrying. The inventors have further appreciated that the use of a wearable device such as a smart watch to monitor physiological data for signs of problem gambling behavior may provide a discreet way of achieving such monitoring without being conspicuous to other players or passersby, especially if the wearable device resembles or doubles as an article of clothing or accessory that the player might normally wear.

According to some embodiments, physiological data may be captured by a smart watch worn by a player of a wagering game. A smart watch may be a particularly convenient and effective way to supply physiological data to a gaming device, as it may include one or more built in sensors to measure the player's physiological activity in addition to wireless communication capabilities that can be used to send physiological data and/or receive instructions to/from the gaming device. The inventors have further appreciated that a smart watch may include a convenient display area and/or audio output capabilities that may be used in some embodiments to alert the wearer to problem gambling behavior, in an article and location which people may already be accustomed to looking at and/or listening to (e.g., for telling time, time-based alarms, etc.). Again, the inventors have recognized that this aspect may allow problem gambling behavior alerts and information to be communicated discreetly, as others may not take particular notice when a person looks at information on his watch or has a watch that is beeping.

According to some embodiments, physiological data may be captured by one or more sensors of a wearable device that measure the player's physical state and/or movements of the player. As non-limiting examples, the wearable device may include sensor such as a heart rate monitor, an accelerometer, an electrodermal activity (e.g., galvanic skin response, skin conductance, skin resistance, etc.) sensor, a pedometer, blood oxygen level detector, blood glucose level detector, body temperature sensor, etc., or combinations thereof.

According to some embodiments, a gaming device may provide instructions to a wearable device worn by a player of a wagering game operated by the gaming device. The instructions, in some embodiments, may be relating to problem gambling behavior. The instruction may, for instance, take the form of (or may be an instruction to generate) an alert to the player that their behavior constitutes problem gambling behavior, and/or to provide suggested actions to the player based on responsible gaming strategies (e.g., suggesting the player take a break). The gaming device may make a determination that such an instruction should be generated based on physiological data received from the wearable device and/or based on other data sources. Exemplary processes for making such a determination and other data sources on which this determination may depend are discussed further below.

According to some embodiments, a gaming device may access historical data of a player's wagering activity to determine whether the player is exhibiting problem gambling behavior. This historical data may include wagering activity during a current session of gaming using the gaming device and/or may include wagering activity performed by the player in the past (which may include wagering activity performed on a different device, on a different day and/or in a different location to a present gaming location). For instance, a player in a casino may have been playing a game for an hour but may have played a different game using a mobile device the day before. Historical data of this player's wagering activity of both the last hour and the gaming performed using the mobile device may be considered when determining whether the player is exhibiting problem gambling behavior.

Irrespective of the location(s) at which historical data of a player's wagering actions was obtained, when the historical data was obtained and/or which device(s) generated the historical data, various aspects of such data may be considered when making a determination of whether the player is exhibiting problem gambling behavior. As non-limiting examples, any of the following may be considered: wager sizes (including, for example, an analysis of how the size changes over time), frequency of wagering activity, duration of play (e.g., in a single session, over a period of time), an amount of money lost by the player, a variance in how much money the player has won or lost (a measure of the player's "swing"), the number and location of locations at which the player has played wagering games, the type(s) of wagering games played, etc., or combinations thereof. Any one or more of such factors or other factors may, alone or in combination, be indicative of whether a player is exhibiting problem gambling behavior.

According to some embodiments, a determination of whether a player is exhibiting problem gambling behavior may be made by identifying whether a risk assessment of the player has passed a predetermined threshold value. Risk assessments may be defined in any suitable way, e.g., as a particular function of one or more data values associated with the player, including any physiological data captured by a wearable device or otherwise and/or historical data of the player's wagering activity. Once the value of a risk assessment has been calculated for a player, a determination may be made as to whether the value passes a threshold previously selected for that risk assessment as representing an amount above which the player is considered to exhibit problem gambling behavior.

As a simple non-limiting example, a risk assessment may be defined as the player's heart rate, and a threshold value of this risk assessment may have been selected to represent a heart rate above which the player is presumed to be exhibiting problem gambling behavior. As another example, a risk assessment may be defined as a function of the player's motion (e.g., using an accelerometer on a wearable device) and the frequency and size of the player's wagers. Together, this data may provide a risk assessment of how agitated the player is (e.g., if the player is moving a lot and placing a lot of high value wagers, the risk assessment's value may be high, whereas if the player is not moving very much and is placing less frequent, smaller wagers, the risk assessment's value may be low). A threshold value of this risk assessment may be defined and compared to a calculated value of the risk assessment when making a determination of whether the player is exhibiting problem gambling behavior.

According to some embodiments, a determination of whether a player is exhibiting problem gambling behavior may be made using one or more machine learning algorithms. For instance, one or more statistical classifiers may have previously been trained on data captured from a number of players for whom it is known whether or not they were exhibiting problem gambling behavior. The classifiers may then be used by applying the classifiers to input data from an unknown player to produce an indication (e.g., a confidence value) of how likely it is that the player is exhibiting problem gambling behavior. A threshold value for this indication may be selected so as to tune the system to avoid false positive identifications of problem gambling behavior and to identify true instances of problem gambling behavior.

According to some embodiments, once it has been determined that a player is exhibiting problem gambling behavior, the gaming device being accessed by the player may alter one or more aspects of the game being played on the device. At least some of these aspects may be selected with the aim of curbing the exhibited problem gambling behavior. For example, the one or more aspects of the game being altered may include a speed of the game (e.g., so as to reduce the frequency at which the player may wager), the magnitude(s) of wagering options available (e.g., lower a maximum bet size, scale multiple bet sizes to smaller values), prohibiting the player from accessing particular aspects of the game (e.g., prohibit the player from playing a bonus game), etc., or combinations thereof. Alternatively, the gaming device may simply lock the player out of the gaming device by logging the player out, by disabling his account, etc.

While one of more of the above-described techniques may be used to determine whether a player is exhibiting problem gambling behavior, the inventors have recognized that unless the player chooses to participate in a program that utilizes such techniques, the player may be unable to benefit from them. According to some embodiments, therefore, a wagering game may be configured to offer benefits to players who willingly participate in a responsible gaming program—that is, who agree to provide physiological data to a gaming device with the understanding that the gaming device may provide feedback on the player's physical and mental state designed to curb problem gambling behavior. For example, a gaming device may offer in-game rewards such as a bonus game, free play, etc. and/or out-of-game rewards, such as complementary services or casino rewards points to participating players. According to some embodiments, a wagering game itself may be configured to function based on physiological input, such as a heart rate (e.g., the game may require the player to have a low heart rate to be eligible for bonus prizes). In such cases, a player may be encouraged to supply physiological input in order to play the game, thereby promoting participation of a player in a responsible gaming program.

Following below are more detailed descriptions of various concepts related to, and embodiments of, techniques of identifying problem gambling behavior in a player of a wagering game. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an exemplary system suitable for practicing aspects of the present application. System 100 includes a wearable device 110, which communicates with a gaming device 120. The gaming device 120 may communicate with an optional server 130. A player, who is also the wearer of wearable device 110, may interact directly with gaming device 120 (e.g., by pushing buttons, pulling levers, accessing a touch interface, etc. of the gaming device). The communications link 151 has a function of providing physiological data from the wearable device to the gaming device and/or of providing alerts or other data from the gaming device to the wearable device.

As discussed above, a wearable device, such as wearable device 110, may capture physiological data from a player wearing the device and who is playing a wagering game on a gaming device, such as gaming device 120. A determination may be made by gaming device 120 and/or the server 130 as to whether the player is exhibiting problem gaming behavior. This determination may be made based on the physiological data and/or other data, such as historical gaming data as discussed above. When the determination is made, the gaming device may adjust one or more aspects of the game being played and/or may provide an instruction to the wearable device to present an alert to the player.

Wearable device 110 may be a watch, headset, armband or any other wearable device suitable for capturing physiological data from the player and transmitting the data to the gaming device 120.

The wearable device may include one or more sensors 115 that may each capture one or more types of physiological data of a wearer of the device. As a non-limiting list, sensor(s) 115 may include any one or more of the following: a heart rate monitor, an accelerometer, an electrodermal activity sensor, a pedometer, blood oxygen level detector, blood glucose level detector, body temperature sensor, or any other suitable physiological data sensor, or any suitable combination of such sensors. The physiological data obtained by the sensor(s) may include raw data captured by the sensor(s), though may additionally or alternatively include physiological measurements derived from the raw sensor data, such as measures of: heart rate, stress, player motion, agitation, fatigue, body temperature, anxiety, shakiness, depression, irritability, etc., or combinations thereof.

According to some embodiments, wearable device 110 may include one or more output devices (not shown in FIG. 1), such as a display, audio output, vibration motor, etc. One or more of the output devices may be used to provide an alert to the wearer indicating that the wearer is exhibiting problem gambling behavior. For instance, the wearable device may display a visual message on a screen indicating that the wearer is exhibiting problem gambling behavior, which may include information about the player's actions and/or state of mind and/or may provide guidance as to how the player might calm down or otherwise adjust their behavior. In some implementations, the wearable device may vibrate and/or play a sound to indicate to the wearer that such a visual message is being displayed, and/or may provide a problem gambling behavior alert in audio and/or haptic form without any accompanying visual message.

According to some embodiments, gaming device 120 may record wagering actions performed by the player. As discussed above, the wearer of the wearable device 110 may play a wagering game operated by the gaming device 120 by interacting directly with the gaming device 120. Any number of actions performed by the player in the wagering game may be logged by the gaming device 120. According to some embodiments, some or all of the wagering actions logged by the gaming device may be sent to optional server 130. Such a transfer may be performed so as to store historical data in a central location that may be accessed by gaming devices other than gaming device 120. Wagering actions logged by gaming device 120 may for example include, for each wager, a date and time the wager was placed, an amount of the wager, whether the wager resulted in a win—and if so, an amount of the win, or combinations thereof.

According to some embodiments, gaming device 120 may include any suitable device on which a wagering game may be executed, including but not limited to: casino gaming machines (e.g., electronic gaming machines, or "EGMs"), personal computers, mobile devices (e.g., tablets, smartphones, etc.), lottery machines, etc.

According to some embodiments, gaming device 120 may perform a determination of whether the player is exhibiting problem gambling behavior. As discussed above, in some embodiments this may comprise determining whether the player's behavior exceeds a predetermined risk threshold. In some embodiments, the gaming device 120 may receive historical gaming data from the server 130 that may be used to make the determination, and/or may access such historical gaming data of the player that has been stored at the gaming device 120. The determination of whether the player is exhibiting problem gambling behavior may be performed by the gaming device 120 based on any suitable combination of wagering actions that the gaming device logged from the player itself and of wagering actions that the gaming device receives from the server 130.

According to some embodiments, gaming device 120 may be configured to provide one or more incentives to a player of a wagering game to positively encourage that player to participate in a responsible gaming program. As discussed above, while techniques are described herein to determine whether a player is exhibiting problem gambling behavior, the inventors have recognized that unless the player chooses to participate in a program that utilizes such techniques, the player may be unable to benefit from them. Accordingly, gaming device 120 may provide incentives such as free play, contests, bonus games, reward points, complementary services ("comps"), or combinations thereof, to encourage participation in the program. For example, a player who uses a casino rewards card to access a gaming device may be asked to participate in the responsible gaming program and, if the player accepts, may receive reward points on the gaming device contingent on the player's continued participation in the program (that is, continuing to provide physiological data and as a result potentially receiving notifications indicating whether the player may be exhibiting problem gambling behavior).

According to some embodiments, server 130 may perform a determination of whether the player is exhibiting problem gambling behavior. The determination of whether the player is exhibiting problem gambling behavior may be performed by the server 130 based on wagering actions that the server receives from the gaming device 120 and/or based on wagering actions stored by the server. This configuration may have a benefit of either not storing, or storing only for a limited time, historical gaming data from a player on a gaming device, which may be preferable to protect a player's privacy by storing data associated with them in a secure location.

It will be appreciated that while server 130 is depicted in the example of FIG. 1 as a single unit, server 130 may in some embodiments be a cluster of physical computing devices in one or more physical locations, as embodiments are not limited to any particular server architecture.

Communication links 151 and 152 may each comprise any number of wired and/or wireless communication connections, and may utilize any suitable wired and/or wireless technologies to send and/or receive data. According to some embodiments, data transmitted via communication links 151 and/or 152 may be encrypted (e.g., via AES-256, or any other suitable encryption technique) to protect the privacy of data relating to a player.

Figure 2:
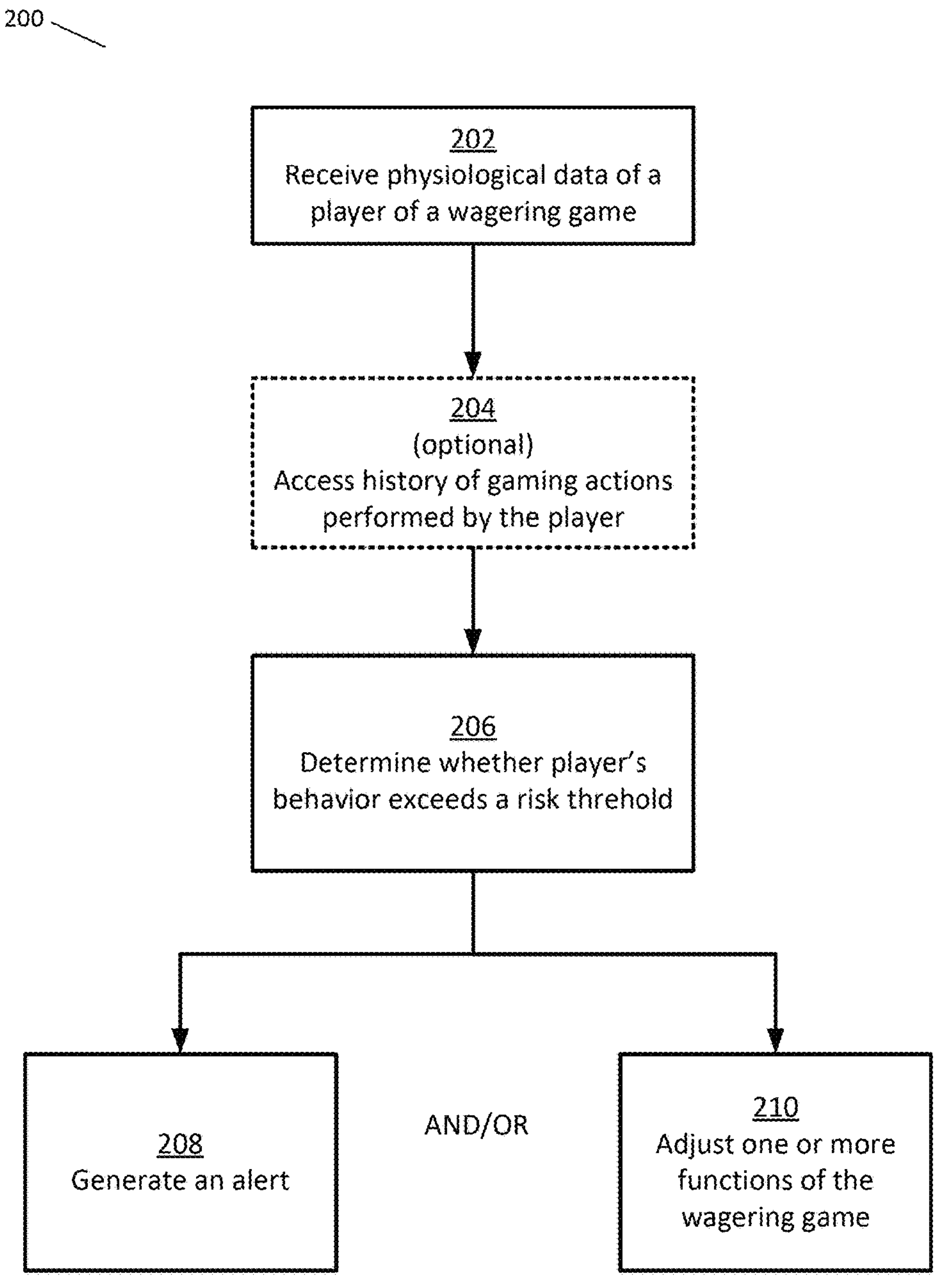
FIG. 2 is a flowchart illustrating a method of determining whether a player of a wagering game is exhibiting problem gambling behavior, according to some embodiments.

FIG. 2 is a flowchart of an exemplary method of determining whether a player of a wagering game is exhibiting problem gambling behavior, according to some embodiments. Method 200 may be performed by any suitable system, which may include a gaming device, such as gaming device 120 in the example of FIG. 1, and/or may include a server, such as server 130 in the example of FIG. 1.

Method 200 begins in act 202, in which physiological data of a player of a wagering game is received. The physiological data may have been generated by a wearable device having one or more sensors, as described in greater detail above.

In act 204, a history of gaming actions performed by the player may optionally be accessed. The history may be accessed from a computer readable storage medium of the system performing method 200, or may be accessed from a computer readable storage medium of a remote device via a wired and/or wireless communication link.

In act 206, the system performing method 200 determines whether the player's behavior exceeds a predetermined risk threshold for problem gambling behavior. The system performing method 200 may perform this determination based on the physiological data received in act 202, on a history of gaming actions accessed in optional act 204, and/or on other data associated with the player. As discussed above, making the determination may comprise accessing a machine learning algorithm such as a statistical classifier that was previously trained on physiological data taken from players for whom it was known whether they were exhibiting, or not exhibiting, problem gambling behavior.

When it is determined in act 206 that the player exceeds the risk threshold for exhibiting problem gambling behavior, an alert is generated in act 208 and/or one or more functions of the wagering game are adjusted in act 210. As discussed above, the alert may be generated by producing a message to send to a wearable device indicating that the wearable device should present the alert (e.g., via visual display, via audio, etc.). Additionally, or alternatively, the alert may be presented by the system performing method 200 (e.g., presented on a screen of a gaming device). In act 210, one or more functions of the wagering game such as allowed wagering amounts, speed of play, etc. as discussed above may be adjusted.

Figure 3A:
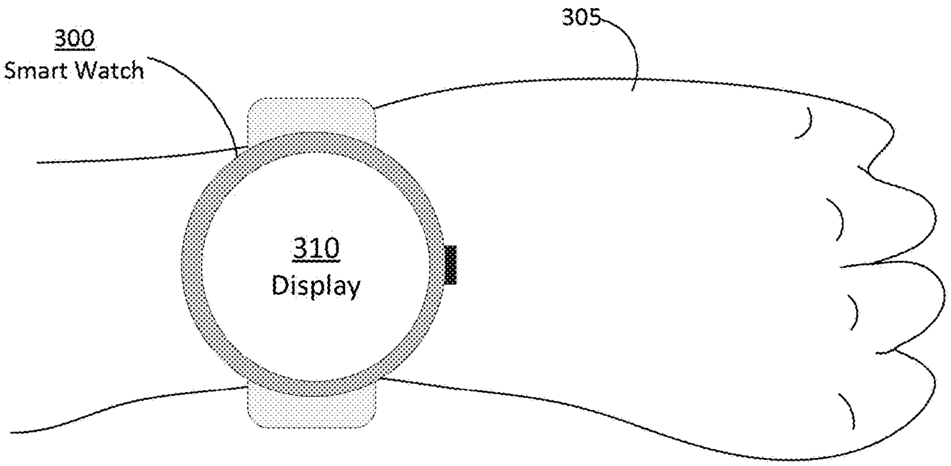
FIGS. 3A-3B depict an exemplary smart watch, according to some embodiments.
Figure 3B:
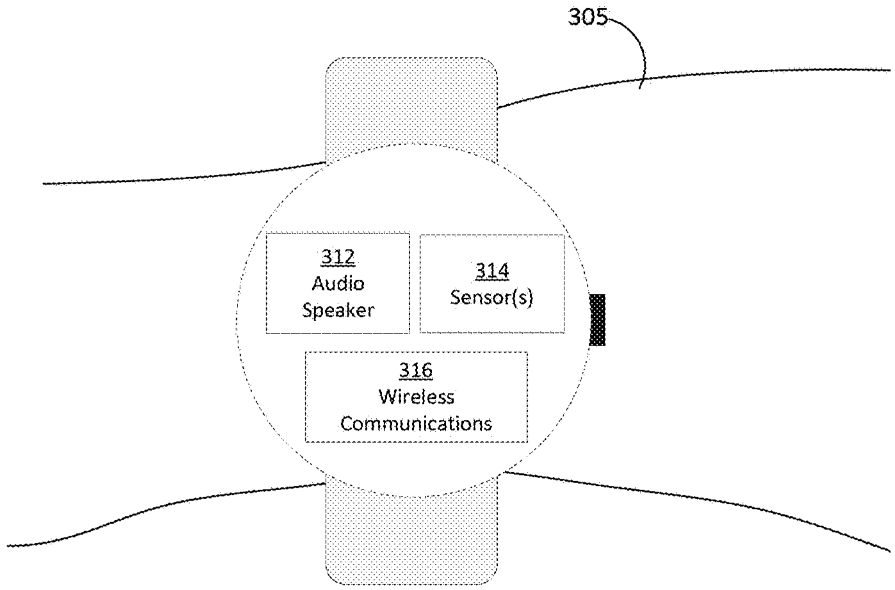

FIGS. 3A-3B depict an exemplary smart watch, according to some embodiments. As discussed above, a wearable device such as wearable device 110 in the example of FIG. 1, may include a so-called "smart watch" in some embodiments. FIG. 3A illustrates an exterior view of a smart watch 300, worn on the wrist of a player 305. The face of the smart watch has a display 310 (e.g., an LCD display, OLED display, etc.). FIG. 3B illustrates some exemplary components that may be included within the smart watch, and includes an audio speaker 312, one or more physiological data sensors 314, and a wireless communications module 316.

Figure 4:
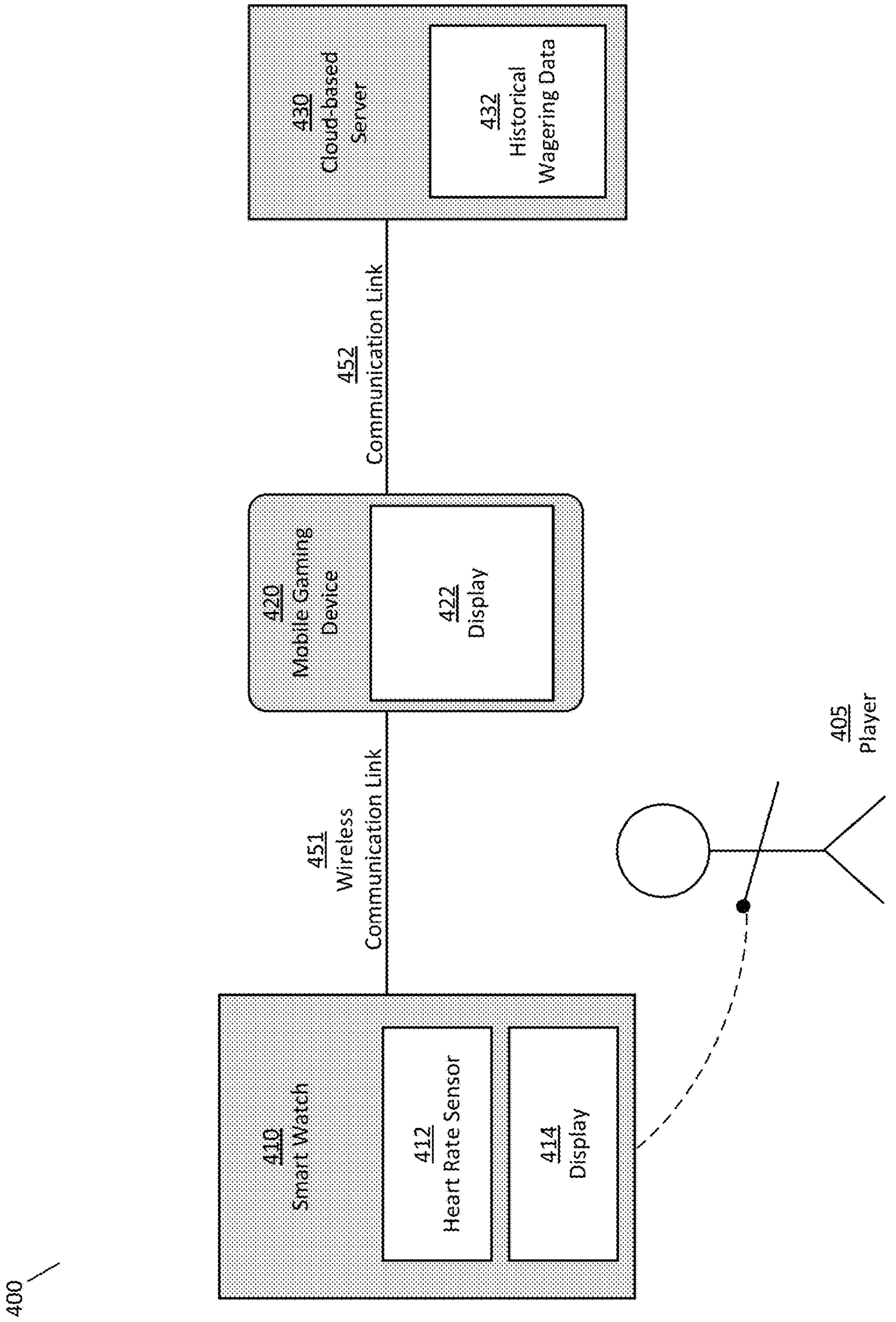
FIG. 4 is a block diagram of a first illustrative system for promoting responsible gaming, according to some embodiments.

FIG. 4 is a block diagram of a first illustrative system for promoting responsible gaming, according to some embodiments. System 400 includes a smart watch 410 worn by a player 405 of a wagering game operated by mobile gaming device 420 (which may be a tablet computer, a smartphone, or any other type of mobile device configured to provide wagering game play). In the example of FIG. 4, smart watch 410 includes a heart rate sensor 412 and a display 414.

As an illustrative example of how system 400 may be operated, the player 405 may be playing a wagering game using mobile gaming device 420, which may for instance be a mobile telephone or a tablet. While the player is playing the wagering game, the heart rate sensor within the smart watch that the player is wearing may be periodically capturing a heart rate measurement from the player. This data may be transmitted via wireless communication link 451 to the mobile gaming device 420.

The mobile gaming device may periodically initiate a determination of whether the player 405 is exhibiting problem gambling behavior by obtaining historical wagering data 432 from the server 430 and by analyzing the historical wagering data in addition to heart rate data received from the smart watch 410. If it is determined that the player is indeed exhibiting problem gambling behavior, an instruction may be sent from the mobile gaming device 420 to the smart watch 410 indicating that the smart watch should present a message to the player via display 414. Physiological data and historical wagering data may be analyzed in combination in any suitable way to detect and/or predict problem gambling behavior. For example, a detection of possible problem gambling behavior may be triggered by a series of rapid wagers coupled with a high heart rate, or by a pattern of increasing wager amounts coupled with an increasing heart rate, or by a large win coupled with a jump in heart rate, or by any other suitable triggering combination that causes a player's risk assessment to exceed a specified threshold.

It may be appreciated, that other techniques described herein to operate system 400 to determine whether player 405 is exhibiting problem gambling behavior may also be used, and that the above example is non-limiting.

Figure 5:
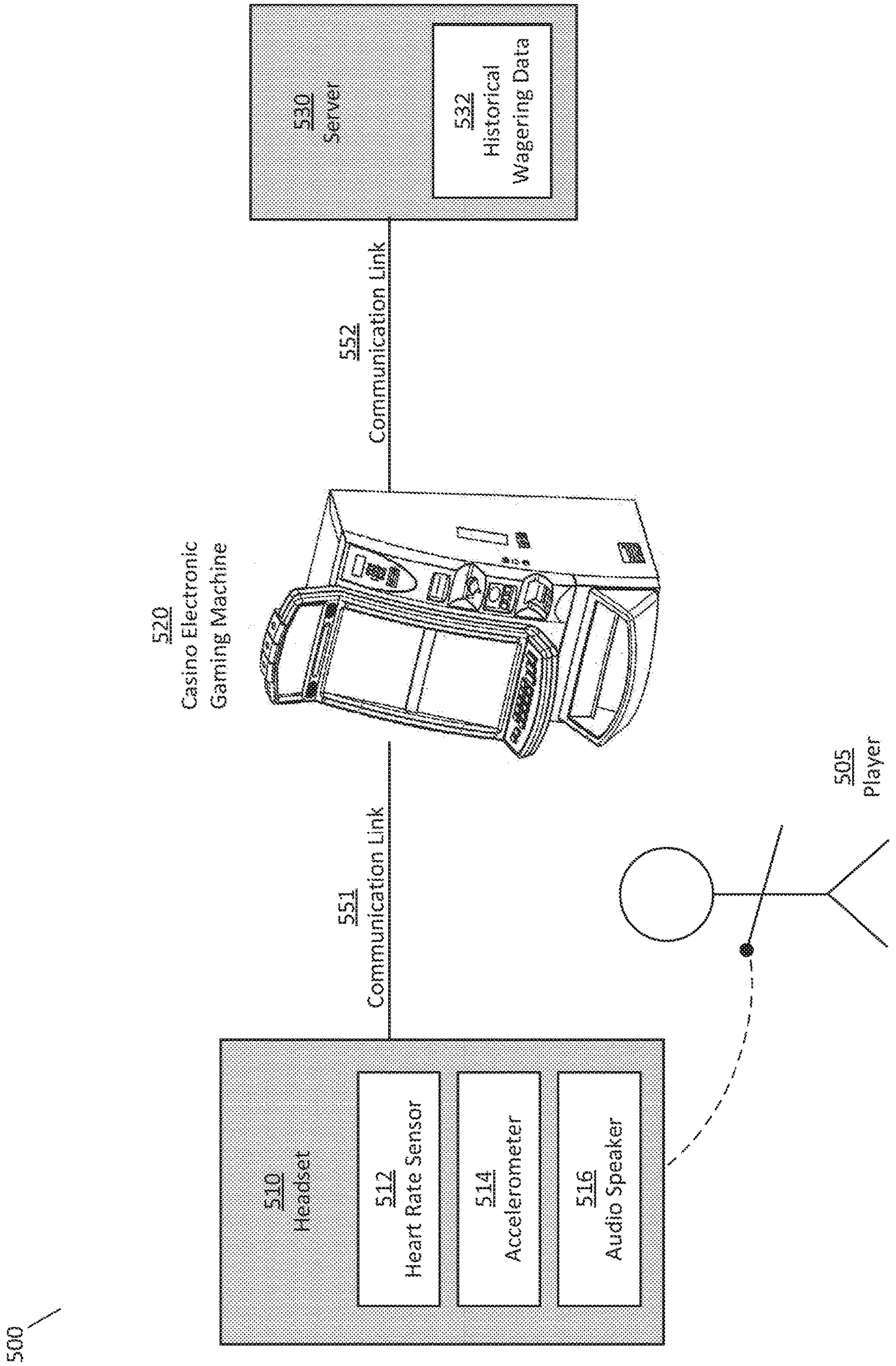
FIG. 5 is a block diagram of a second illustrative system for promoting responsible gaming, according to some embodiments.

FIG. 5 is a block diagram of a second illustrative system for promoting responsible gaming, according to some embodiments. System 500 includes a headset 510 worn by a player 505 of a wagering game operated by casino electronic gaming machine (EGM) 520. In the example of FIG. 5, headset 510 includes a heart rate sensor 512, an accelerometer 514 and an audio speaker 516. An example of a casino EGM 520 is discussed below in relation to FIG. 6.

As an illustrative example of how system 500 may be operated, the player 505 may be playing a wagering game using EGM 520 while wearing headset 510. While the player is playing the wagering game, the heart rate sensor and accelerometer within the headset that the player is wearing may be periodically capturing heart rate measurements and measurements of motion, respectively, from the player. This data may be transmitted via communication link 551 to the EGM 520.

The EGM 520 may periodically initiate a determination of whether the player 505 is exhibiting problem gambling behavior by obtaining historical wagering data 532 from the server 530 and by analyzing the historical wagering data in addition to the heart rate data and/or accelerometer data received from the smart watch 510. The physiological data that includes both the heart rate and motion data may together be analyzed to determine how agitated the player is. This measure of physical agitation may be compared with a predetermined threshold of agitation, and if the player is exhibiting agitation above this threshold, the EGM 520 may accordingly conclude that the player is exhibiting problem gambling behavior. In this case, an instruction may be sent from the EGM 520 to the headset 510 indicating that the headset should present a message to the player via audio speaker 514.

Figure 6:
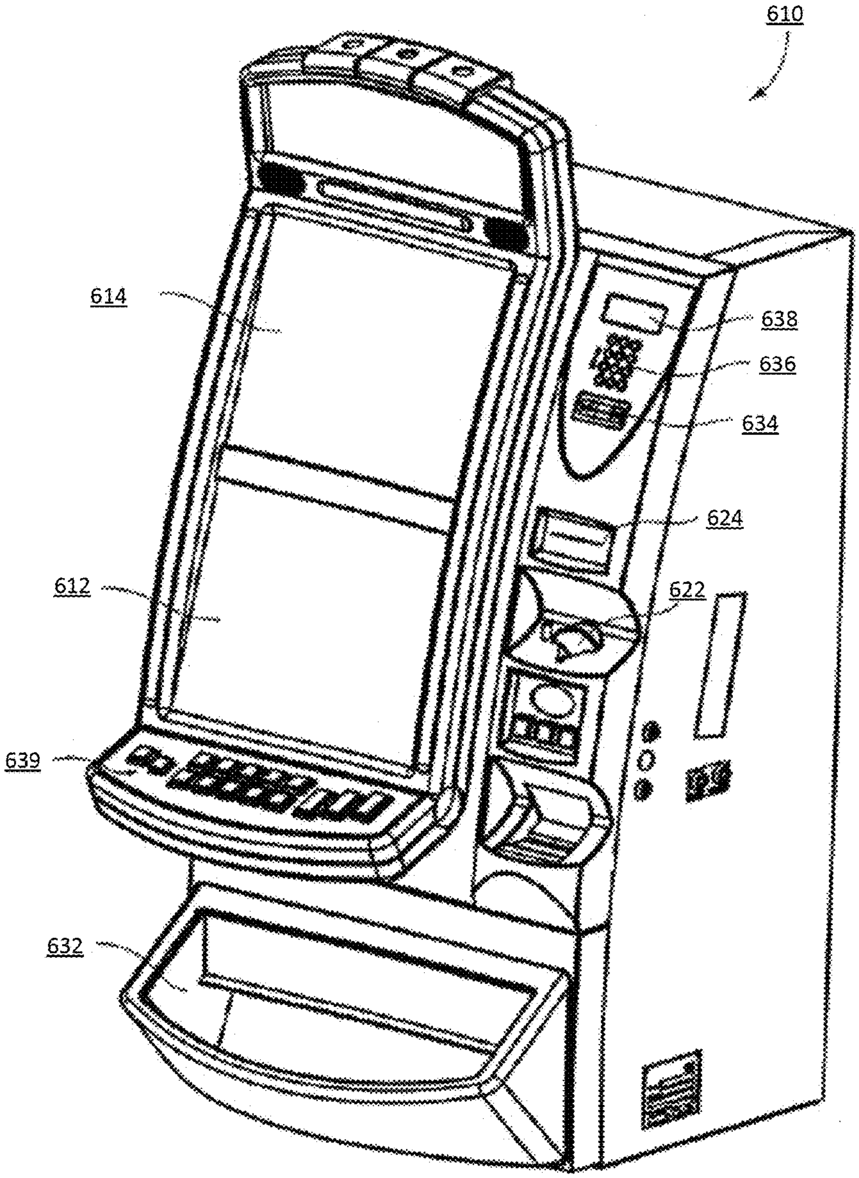
FIG. 6 is a perspective view illustrating an illustrative cabinet housing a casino gaming machine in accordance with some embodiments.

FIG. 6 shows a perspective view of an illustrative gaming device, being a cabinet 610 housing a casino gaming machine, in accordance with some embodiments. Illustrative cabinet 610, as depicted in FIG. 6, includes a display 612, a second display 614, a coin slot 622, a coin tray 632, a card reader slot 634, a keypad 636, and player control buttons 639.

Display 612 may be a thin film transistor (TFT) display, a liquid crystal display (LCD), a cathode ray tube (CRT) display, a light-emitting diode (LED) display, an organic LED (OLED) display, an autostereoscopic three dimensional (3D) display, or any other type of display.

Second display 614 may provide game data or other information in addition to the information provided by display 612. Display 614 may provide static information, such as an advertisement for the game, the rules of the game, pay tables, pay lines, and/or other information, and/or may even display the main game or a bonus game along with display 612. Alternatively, the area for display 614 may be a display glass for conveying information about the game.

Display 612 and/or display 614 may have a touch screen lamination that includes a transparent grid of conductors. A player touching the screen may change the capacitance between the conductors, and thereby the X-Y location of the touch on the screen may be determined. A processor within cabinet 610 may associate this X-Y location with a function to be performed. There may be an upper and lower multi-touch screen in accordance with some embodiments.

A coin slot 622 may accept coins or tokens in one or more denominations to generate credits within the casino gaming machine for playing games. An input slot 624 for an optical reader and printer may receive machine readable printed tickets and may output printed tickets for use in cashless gaming.

A coin tray 632 may receive coins or tokens from a hopper (not shown) upon a win or upon the player cashing out. However, in some embodiments, the casino gaming machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer system.

A card reader slot 634 may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino gaming machine. The card reader may also include an optical reader and printer for reading and printing coded barcodes and other information on a paper ticket. A card may also include credentials that enable the host system to access one or more accounts associated with a user. The account may be debited based on wagers by a user and credited based on a win. Such accounts may comprise cash or a non-cash currency. Alternatively, a card reader based on a wireless technology such as near field communication (NFC) and/or radio frequency ID (RFID) tags may be employed.

A keypad 636 may accept player input, such as a personal identification number (PIN) and/or any other player information. A display 638 above keypad 636 may display a menu for instructions and/or other information, and/or may provide visual feedback of the keys pressed. The keypad 636 may be an input device such as a touchscreen, or dynamic digital button panel, in accordance with some embodiments.

Player control buttons 639 may include any buttons and/or other controllers usable for the play of the particular game or games offered by the casino gaming machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 639 may be replaced by a touch screen with virtual buttons. In some embodiments, touchless control gesture functionality may replace or coexist with buttons 639.

Figure 7:
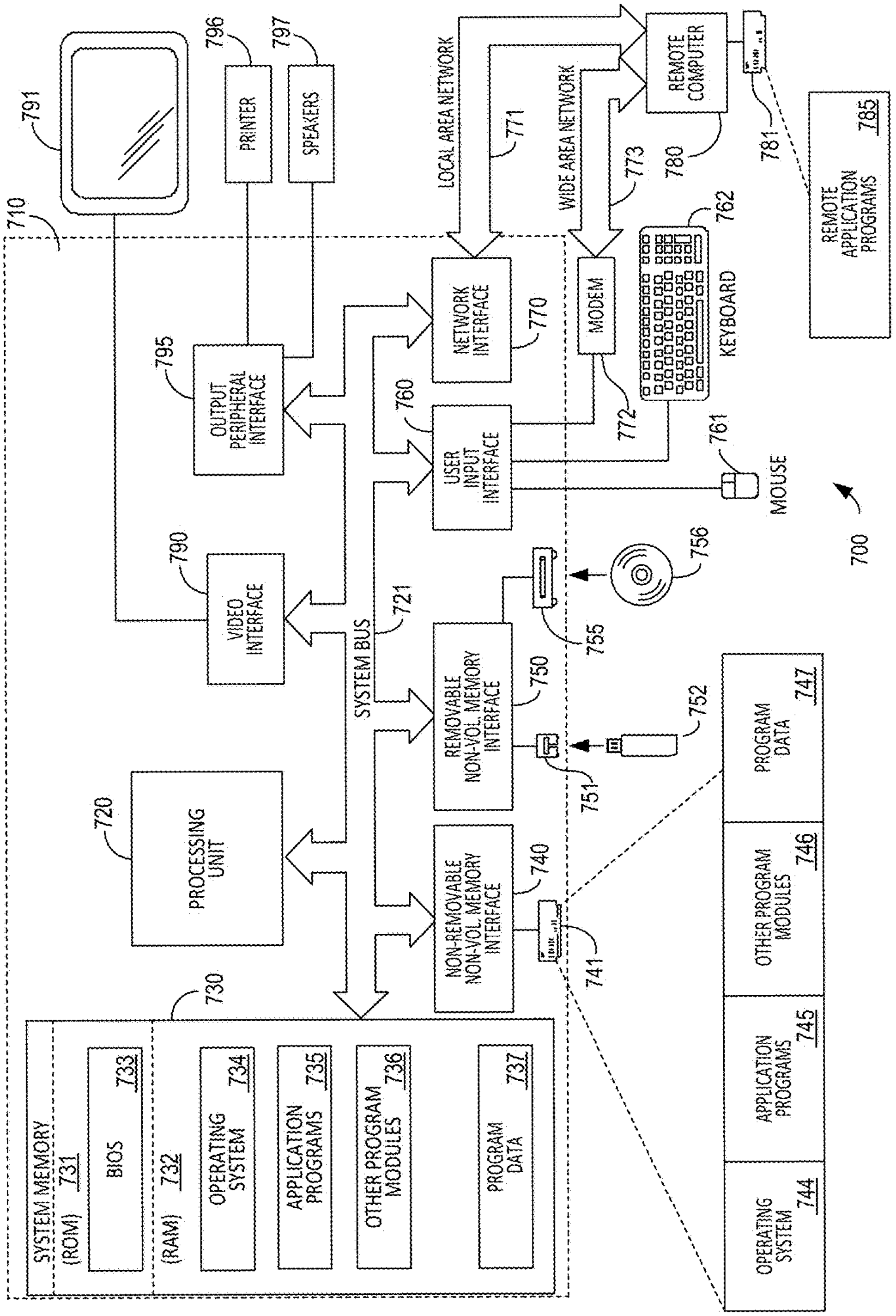
FIG. 7 illustrates an example of a computing system environment on which various embodiments may be implemented.

FIG. 7 illustrates an example of a suitable computing system environment 700 on which the technology described herein may be implemented. For example, some or all components of computing system environment 700 may be used in implementations of gaming device 120 and/or server 130 in some embodiments. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the illustrative operating environment 700.

The technology described herein is operational with numerous other computing system environments or configurations. Examples of computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an illustrative system for implementing the technology described herein includes a computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile storage unit 752 (e.g., a flash memory drive having a Universal Serial Bus (USB) interface or other suitable interface), and an optical disk drive 755 that reads from or writes to a removable, nonvolatile optical disk 756 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are illustrative and other means of establishing a communications link between the computers may be used.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may be implemented as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various embodiments as discussed above. As used herein, the term "computer-readable storage medium" encompasses only a non-transitory computer-readable medium that can be considered to be a manufacture (i.e., article of manufacture) or a machine. Alternatively or additionally, embodiments may be implemented as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various embodiments as discussed above. Additionally, it should be appreciated that according to one aspect of this embodiment, one or more computer programs that when executed perform methods need not reside on a single computer or processor, but may be distributed in a modular fashion amongst a number of different computers or processors to implement various embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various embodiments may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments may be implemented as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of assessing behavior of a player of a wagering game, the method comprising:

receiving, at a wagering gaming device that comprises a card reader that reads player and/or credit information, via a wireless communication interface from a wearable device worn by the player of a wagering game, physiological data of the player obtained using at least one sensor of the wearable device worn by the player;

accessing, from a processor-readable storage medium of the wagering gaming device, a history of gaming actions previously performed by the player;

determining, using at least one processor, whether the player is exhibiting behavior exceeding at least one predefined risk threshold based at least in part on an automated analysis of the received physiological data and an occurrence of an event during a playing session that includes at least one of a series of rapid wagers and increasing wager amounts; and when it is determined that the player is exhibiting behavior exceeding the at least one predefined risk threshold, performing at least one action by the wagering gaming device designed to reduce the exhibited behavior below the at least one predefined risk threshold in response to said determination, wherein the predefined risk threshold comprises a function of the physiological data and represents a quantity above which the player is considered to exhibit problem gambling behavior, wherein the at least one action designed to reduce the exhibited behavior below the at least one predefined risk threshold comprises adjusting a speed of the wagering game.

2. The method of claim 1, wherein the wearable device is a smart watch and wherein the wagering device is a tablet or mobile telephone.

3. The method of claim 1, wherein the wagering gaming device is a casino electronic gaming machine (EGM).

4. The method of claim 1, wherein the history of gaming actions include gaming actions taken by the player for the wagering game and gaming actions taken by the player for a different wagering game.

5. The method of claim 1, wherein the at least one action designed to reduce the exhibited behavior below the at least one predefined risk threshold further comprises locking out the player from the wagering gaming device.

6. The method of claim 1, wherein the physiological data comprises a measure of the player's heart rate.

7. The method of claim 1, wherein determining that the player is exhibiting behavior exceeding at least one predefined risk threshold comprises detecting a pattern that includes at least one of:

a series of rapid wagers and an elevated heart rate;

increasing wager amounts and an increasing heart rate; and a large win and a jump in heart rate.

8. The method of claim 1, wherein the physiological data comprises a heart rate and motion data that are analyzed together to determine a measure of physical agitation, and wherein the measure of physical agitation is compared to a predefined agitation threshold.

9. A method of assessing behavior of a player of a wagering game, the method comprising:

receiving, at a wagering gaming device, via a wireless communication interface from a wearable device worn by the player of the wagering game, physiological data of the player obtained using at least one sensor of the wearable device worn by the player;

determining, using at least one processor, whether the player is exhibiting behavior exceeding at least one predefined risk threshold based at least in part on an automated analysis of the received physiological data and an occurrence of an event during a playing session that includes at least one of a series of rapid wagers and increasing wager amounts; and when it is determined that the player is exhibiting behavior exceeding the at least one predefined risk threshold, performing at least one action by the wagering gaming device designed to reduce the exhibited behavior below the at least one predefined risk threshold in response to the determination, wherein the predefined risk threshold comprises a function of the physiological data and represents a quantity above which the player is considered to exhibit problem gambling behavior, wherein the at least one action designed to reduce the exhibited behavior below the at least one predefined risk threshold comprises locking out the player from the wagering gaming device.

10. The method of claim 9, wherein the wearable device is a smart watch and wherein the wagering gaming device is a table or mobile telephone.

11. The method of claim 9, wherein the physiological data comprises a measure of the player's physical motion.

12. The method of claim 9, wherein the determination of whether the player is exhibiting the behavior exceeding the at least one predefined risk threshold is performed by the wagering gaming device.

13. The method of claim 9, wherein the wearable device comprises a head mounted display.

14. The method of claim 9, wherein the wearable device includes a headset that includes an accelerometer or a heart rate sensor.

15. A method of assessing behavior of a player of wagering game, the method comprising:

receiving, at a wagering gaming device, via a wireless communication interface from a wearable device worn by the player of the wagering game, physiological data of the player obtained using at least one sensor of the wearable device worn by the player;

determining, using at least one processor, whether the player is exhibiting behavior exceeding at least one predefined risk threshold based at least in part on an automated analysis of the received physiological data and an occurrence of an event during a playing session that includes at least one of a series of rapid wagers and increasing wager amounts; and when it is determined that the player is exhibiting a problem gambling behavior, adjusting at least one gaming function of the wagering game to reduce the exhibited behavior below the at least one predefined risk threshold while allowing the player to wager via the wagering gaming device, wherein adjusting the at least one gaming function comprises altering a size of at least one wager available to the player within the wagering game, wherein the predefined risk threshold comprises a function of the physiological data and represents a quantity above which the player is considered to exhibit problem gambling behavior.

16. The method of claim 15, wherein the wearable device is a smart watch and wherein the wagering gaming device is a tablet or mobile telephone.

17. The method of claim 15, wherein altering the size of the at least one wager comprises reducing a size of a maximum wager.

18. The method of claim 15, wherein the physiological data comprises a measure of the player's heart rate.

* * * * *